United States Patent
Assem et al.

(10) Patent No.: US 9,231,840 B2
(45) Date of Patent: Jan. 5, 2016

(54) OPTIMIZING THE QUALITY OF AUDIO WITHIN A TELECONFERENCING SESSION VIA AN ADAPTIVE CODEC SWITCHING

(71) Applicant: INTERNATIONAL BUSINESS MACHINES CORPORATION, Armonk, FL (US)

(72) Inventors: Haytham Assem, Dublin (IE); Jonathan Dunne, County Waterford (IE); James P. Galvin, Georgetown, KY (US); Patrick J. O'Sullivan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 14/155,573

(22) Filed: Jan. 15, 2014

(65) Prior Publication Data

US 2015/0200826 A1     Jul. 16, 2015

(51) Int. Cl.
*H04W 4/00* (2009.01)
*H04L 12/26* (2006.01)
*H04M 7/00* (2006.01)
*H04L 29/06* (2006.01)

(52) U.S. Cl.
CPC ........ *H04L 43/0829* (2013.01); *H04L 65/1063* (2013.01); *H04L 65/1066* (2013.01); *H04L 65/403* (2013.01); *H04L 65/80* (2013.01); *H04M 7/0084* (2013.01)

(58) Field of Classification Search
None
See application file for complete search history.

(56) References Cited

U.S. PATENT DOCUMENTS 8,433,050 B1    4/2013    Baten et al.
2011/0069625 A1*    3/2011    Michaelis et al. ............ 370/252

* cited by examiner

*Primary Examiner* — Afshawn Towfighi
(74) *Attorney, Agent, or Firm* — Patents on Demand P.A.; Brian K. Buchheit; Scott M. Garrett

(57) ABSTRACT

A Voice over Internet Protocol (VoIP) session between computing devices can be identified. Each computing device can be associated with a communication link. Each of the computing devices can execute a VoIP application. Each application can include selectable codecs. The codecs can be an audio codec and a video codec. A unique list of the selectable codecs can be generated. The list can include sublists which can identify the codecs. A loss threshold with each sublist based on previously determined performance characteristics of the codecs can be associated. The threshold can be a packet loss threshold value of the link associated with the devices. A packet loss metric of the link can be evaluated. The link can be associated with a codec of the sublists. A programmatic action can be performed to select a different codec from the sublists responsive to the evaluating.

17 Claims, 5 Drawing Sheets

Table 112 (e.g., Switching List)

| Sublist ID | Codec IDs | Loss Range | Participant Quantity |
|---|---|---|---|
| Sublist A | C1, C3, C7 | 0% < loss <= 2% | < 10 |
| Sublist B | C2, C10, C8 | 2% < loss <= 5% | 10 < Participants < 20 |
| Sublist C | C5, C6, C11 | 5% < loss <= 10% | 20 < Participants < 35 |
| Sublist D | C9, C4, C12 | loss > 10% | Participants > 35 |

US 9,231,840 B2

OPTIMIZING THE QUALITY OF AUDIO WITHIN A TELECONFERENCING SESSION VIA AN ADAPTIVE CODEC SWITCHING

BACKGROUND

The present invention relates to the field of VoIP telephony and, more particularly, to optimizing the quality of audio within a teleconferencing session via an adaptive codec switching. Contemporary Voice-Over-IP (VoIP) systems typically negotiate a single codec for the entire VoIP session life time of a teleconference. For example, during an initial setup of a VoIP conference call, a VoIP server can select a VoIP audio/video codec which can be utilized based on several criteria such as network conditions, participant quantity, and server settings. This approach provides simple call setup and teardown which can minimize server load. However, as network conditions change, call quality can decrease dramatically. For example, when packet loss between a VoIP client device and the VoIP server increases, the codec chosen by the server can perform poorly resulting in garbled audio which can be incomprehensible to participants using the client device. That is, as different codecs can perform differently well under certain network conditions like delay, jitter and/or packet loss, this can lead to a reduction of quality if network conditions change during the call.

While these codecs can adapt to a limited degree to changing network conditions such as available bandwidth, network delay, and/or packet loss rate change in the meantime, the VoIP clients (e.g., VoIP application) abide with their initial codec choice. Hence, the clients often apply a codec that is not well suited for the present network situation although better codec choices can be available. Additionally, when a teleconference session grows sufficiently large and the number of codecs required for each client device increases, server computation demands can increase drastically. This can cause servers to become unresponsive and utilize lower quality codecs to improve decrease computation, resulting in a poor end user experience of the call.

BRIEF SUMMARY

One aspect of the present invention can include a system, an apparatus, a computing device product, and a method for optimizing the quality of audio within a teleconferencing session via an adaptive codec switching. A Voice over Internet Protocol (VoIP) session between computing devices can be identified. Each computing device can be associated with a communication link. Each of the computing devices can execute a VoIP application. Each application can include selectable codecs. The codecs can be an audio codec and a video codec. A unique list of the selectable codecs can be generated. The list can include sublists which can identify each of the selectable codecs. A loss threshold with each sublist based on previously determined performance characteristics of the codecs can be associated. The threshold can be a packet loss threshold value of the link associated with the devices. A packet loss metric of the link can be evaluated based on one of the selectable codecs. The link can be associated with a codec of the sublists. A programmatic action can be performed to select a different codec from the sublists responsive to the evaluating.

Another aspect of the present invention can include an apparatus, a computing device product, a method, and a system for optimizing the quality of audio within a teleconferencing session via an adaptive codec switching. An optimization engine can be configured to perform adaptive codec switching based on a loss metric, a participant metric, and/or a quality of experience metric. The codec switching can be performed on the communication links associated with a telephony session executing within a multi-control unit (MCU). Each of the links can be associated with a terminal device. Each of the terminal devices can be able to execute a Voice over Internet Protocol (VoIP) application. Each application can include an audio codec. A data store can be able to persist a link mapping, a switching list, and a telephony session data. The switching list can include a sublist of one codec associated with the VoIP application.

DETAILED DESCRIPTION

Figure 1A:
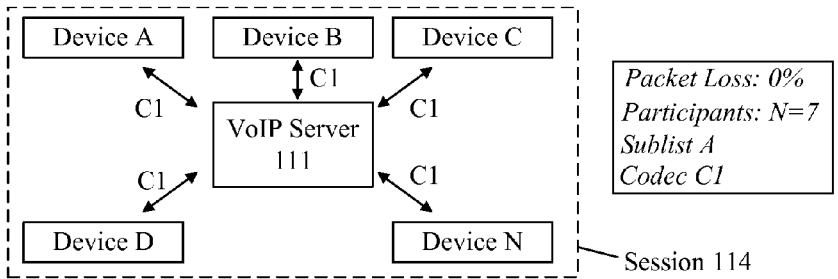
FIGS. 1A & 1B is a schematic diagram illustrating a set of scenarios for optimizing the quality of audio within a teleconferencing session via an adaptive codec switching in accordance with an embodiment of the inventive arrangements disclosed herein.
Figure 1A:
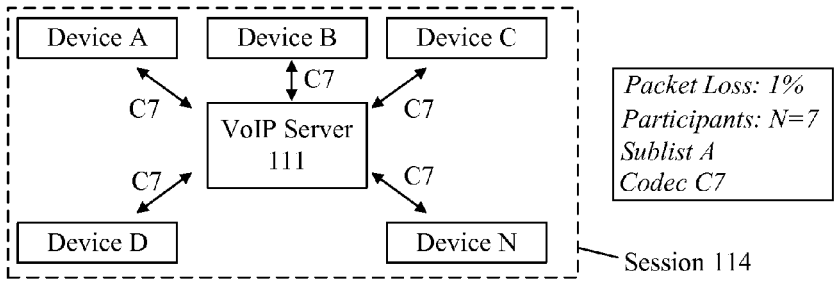
Figure 1A:
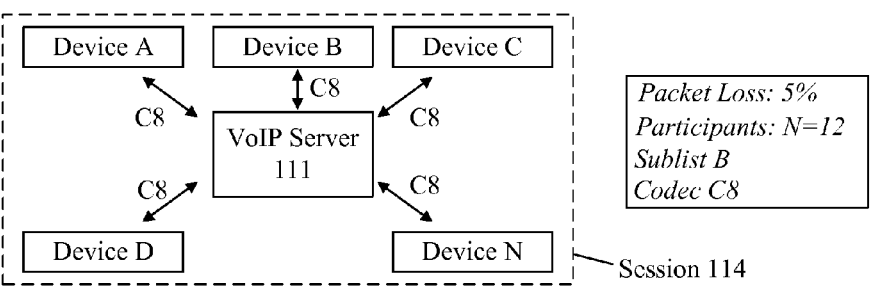

The present disclosure is a solution for optimizing the quality of audio within a teleconferencing session via an adaptive codec switching. In the solution, a set of available audio/video codecs for a teleconference session can be determined. The codecs can be organized into one or more sublists based on the known performance of the codecs. For example, each codec can be evaluated during a set of network criteria to determine codec performance for the criteria. The sublists can be associated with performance characteristics which can be utilized to select a subset of the codecs based on network conditions during the teleconference session. It should be appreciated that the disclosure can function at a runtime level and/or at a session level to adapt to runtime environment changes and/or session changes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
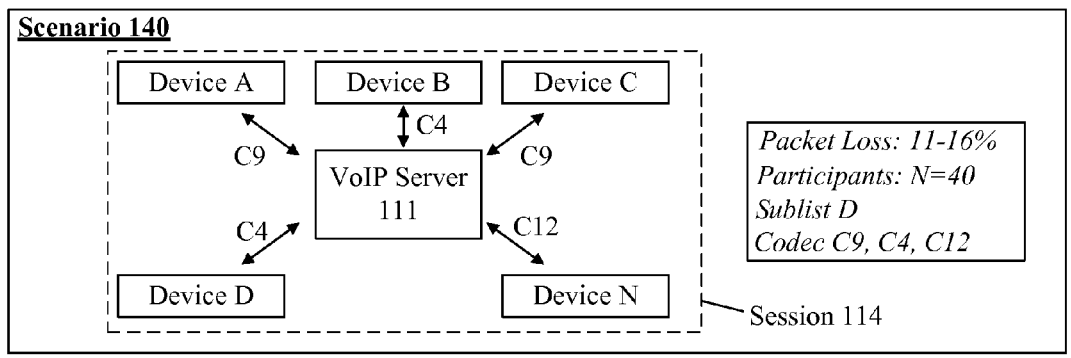

FIGS. 1A & 1B is a schematic diagram illustrating a set of scenarios 110-140 for optimizing the quality of audio within a teleconferencing session via an adaptive codec switching in accordance with an embodiment of the inventive arrangements disclosed herein. Scenarios 110-140 can represent a Voice over Internet Protocol (VoIP) call occurring between a VoIP server 111 and a variable quantity of devices (e.g., Device A-N) communicatively linked to the server. For example, as a call duration increases the number of participants and the network loss conditions can increase, mimicking a common real world problem. In the scenario 110-140, a table 112 can be utilized to enable dynamic audio codec switching in response to changes occurring during a call session. For example, when the number of participating devices within a call increases and/or the packet loss increases, the server 111 can select an appropriate codec which can perform efficiently to compensate for the increases. That is, the disclosure can adapt to changing network conditions in real-time to permit call quality to meet or exceed a perceptual quality.

Table 112 can be a data structure for organizing codecs available within a call session 114. In one embodiment, table 112 can be a representation of a switching list 340 within a telephony server 310. Table 112 can include, but is not limited to, a sublist identifier, a codec identifier, a loss range value, a participant quantity value, and the like. For example, table 112 can permit one or more of a subset of available codecs (e.g., C2, C10, C8 of Sublist B) to be utilized when there are between two and twenty participants within the session 114. It should be appreciated that table 112 can include an arbitrary quantity of sublists, codecs within the sublists, criteria, conditions, and the like. In one embodiment, conditions can include network packet loss, server load, latency, and the like.

In scenario 110, the VoIP server 111 can be communicatively linked to N number of devices where N=7. The server 111 can utilize table 112 to determine an appropriate codec (e.g., Codec C1) which can be utilized for all links to devices (e.g., Device A-N). For example, when network packet loss is at 0%, the table can match the session packet loss (e.g., loss metric) to a packet loss criteria to determine an appropriate sublist (e.g., Sublist A) from which a codec (e.g., C1) can be selected. When the match is successful, the codec (e.g., C1) can be selected for the session.

In scenario 120, the VoIP server 111 can be communicatively linked to N number of devices where N=7. The server 111 can utilize table 112 to determine an appropriate codec (e.g., C7) which can be utilized for all links to devices (e.g., Device A-N). For example, when network packet loss is at 1%, the table can match the session packet loss (e.g., loss metric) to a packet loss criteria to determine an appropriate sublist (e.g., Sublist A) from which a codec (e.g., C7) can be selected. When the match is successful, the codec (e.g., C7) can be selected for the session, replacing the previously selected codec (e.g., C1).

In scenario 130, the VoIP server 111 can be communicatively linked to N number of devices where N=12. The server 111 can utilize table 112 to determine an appropriate codec (e.g., C8) which can be utilized for all links to devices (e.g., Device A-N). For example, when network packet loss is at 5%, the table can match the session packet loss (e.g., loss metric) to a packet loss criteria to determine an appropriate sublist (e.g., Sublist B) from which a codec (e.g., C8) can be selected. When the match is successful, the codec (e.g., C8) can be selected for the session, replacing the previously selected codec (e.g., C7).

In scenario 140, the VoIP server 111 can be communicatively linked to N number of devices where N=40. The server 111 can utilize table 112 to determine an appropriate set of codecs (e.g., C9, C4, C12) which can be utilized for each of the link to devices (e.g., Device A-N). For example, when network packet loss is at a range from 11%-16%, the table can match the session packet loss (e.g., loss metric) to a packet loss criteria to determine one or more appropriate sublists (e.g., Sublist A) from which each codec (e.g., C9, C4, C12) can be selected. That is, server 111 can select a codec C9 for links associated with Device A and Device C, codec C4 for the link associated with Device B, and a codec C12 for links associated with Device N.

It should be appreciated that codec selection data can be utilized to drive feedback processes which can improve subsequent selection of a codec during the session and/or subsequent sessions. Upon termination of the call, the server 111 can teardown communication links to the devices A-N.

It should be understood that the disclosure can utilize any number of criteria to perform the functionality described herein. In one instance, the disclosure can utilize link quantity (e.g., participants) to determine codec sublist selection and codec selection.

Drawings presented herein are for illustrative purposes only and should not be construed to limit the invention in any regard. It should be appreciated that the disclosure can utilize traditional and/or proprietary mechanisms to assess the call quality for link and an overall call quality for the teleconference session.

Figure 2:
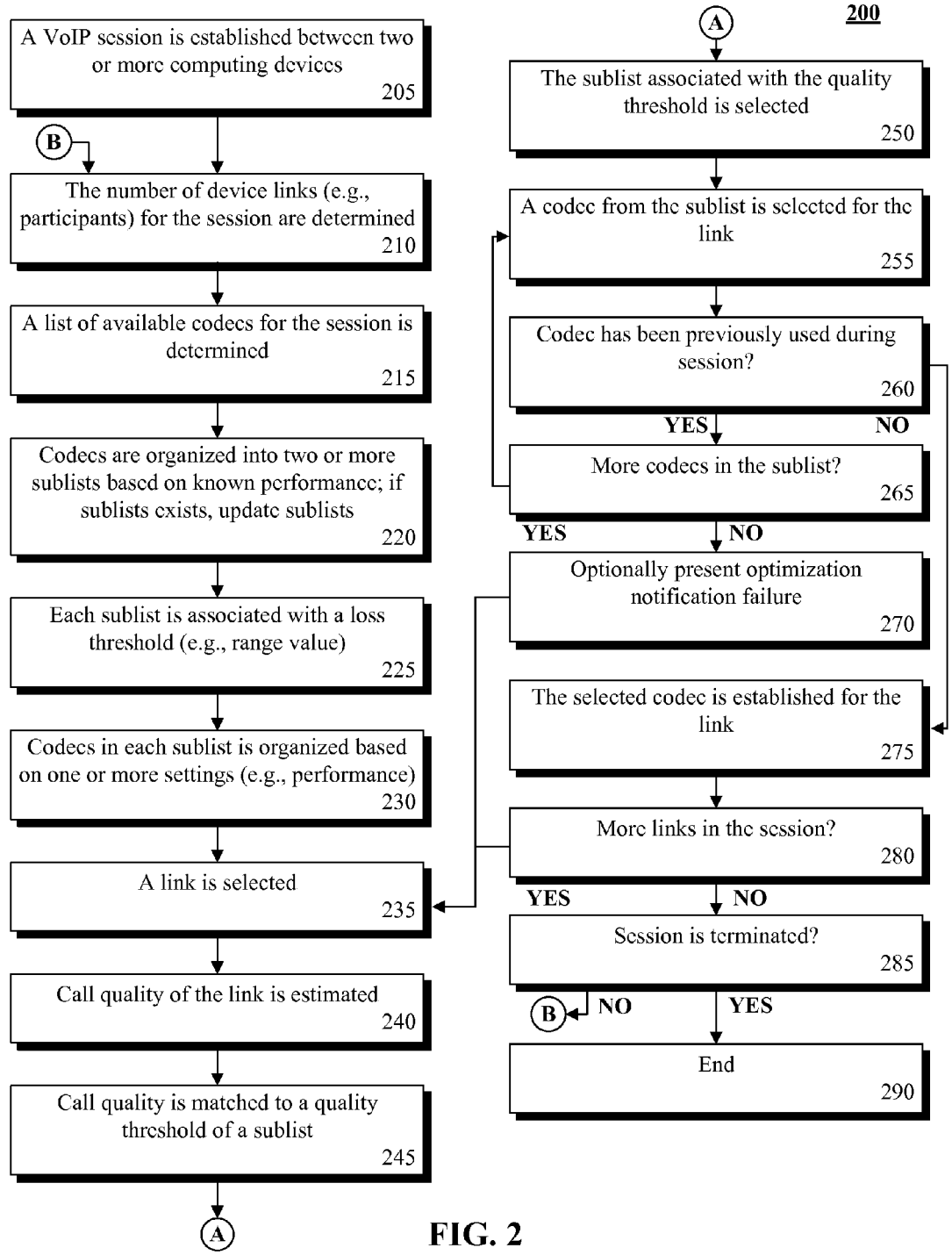
FIG. 2 is a schematic diagram illustrating a method for optimizing the quality of audio within a teleconferencing session via an adaptive codec switching in accordance with an embodiment of the inventive arrangements disclosed herein.

FIG. 2 is a schematic diagram illustrating a method 200 for optimizing the quality of audio within a teleconferencing session via an adaptive codec switching in accordance with an embodiment of the inventive arrangements disclosed herein. In method 200, audio codec processing associated with a Voice over Internet Protocol (VoIP) session can be optimized in real-time utilizing adaptive codec switching based on real-time metrics.

In step 205, a VoIP session can be established between two or more computing devices. In step 210, the number of devices links for the session can be determined. For example, the number of participants can be determined based on the number of accepted invites to a session. In step 215, a list of available codecs for the session can be determined. In step 220, codecs can be organized into two or more sublists based on known performance under known network conditions. If a sublist exists, the sublist can be updated. In step 225, each sublist can be associated with a loss threshold. For example, the threshold can be associated with a packet loss range such as a percentage range (e.g., 2%-5%). It should be appreciated that the loss threshold can include automatically generated values, manually established values, and the like. For example, loss range can be associated with a fuzzy logic range of values.

In step 230, codecs in each sublist can be organized based on one or more settings such as performance, availability, priority, and the like. In step 235, a link associated with the session can be selected. In step 240, the call quality of the link can be estimated. The call quality can be estimated utilizing one or more traditional and/or proprietary metrics. For example, the call quality can be a Mean Opinion Score (MOS) associated with the session or link.

In step 245, the call quality can be matched to a quality threshold of the sublist. In step 250, the sublist associated with the quality threshold can be selected. In step 255, a codec from the sublist can be selected for the link. In step 260, the codec has been previously used during the session, the method can proceed to step 265, else continue to step 275. In step 265, if there are more codecs in the list, the method can return to step 2655, else proceed to step 270. In step 270, an optimization notification failure can be optionally presented. For example, the notification failure can be presented within an administrative interface of a VoIP server and can be logged within an error log file. In step 275, the selected codec can be established for the link.

In step 280, if there are more links within the session, the method can return to step 280, else continue to step 285. In step 285, if the session is terminated, the method can continue to step 290, else return to step 210. In step 290, the method can end.

Drawings presented herein are for illustrative purposes only and should not be construed to limit the invention in any regard. It should be appreciated that method 200 can be performed in serial and/or in parallel. Method 200 can be a functionality of call optimization functionality within a VoIP client and/or server. Method 200 can be performed in real-time or near real time. It should be appreciated that, steps 210-285 can be performed continuously during the lifetime of the session. Steps 235-280 can be performed for each link in the session. In one embodiment, steps 235-238 can be automatically performed when a new link is established during a session. Steps 255-260 can be performed for when a codec is unsuitable and/or unavailable. When no codecs are available in a sublist, the disclosure can select codecs from a different sublist which can be selected based on user preference, historic settings, and the like.

Figure 3:
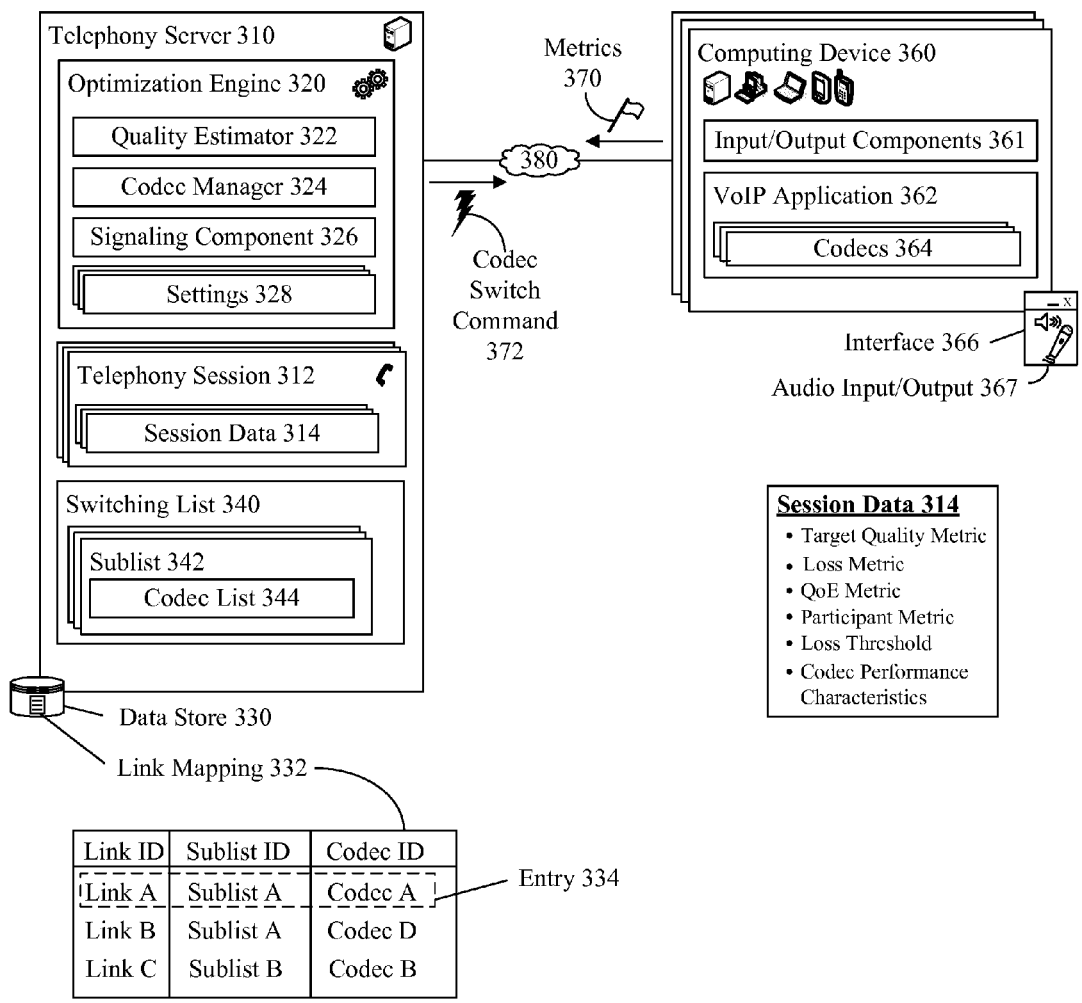
FIG. 3 is a schematic diagram illustrating a system for optimizing the quality of audio within a teleconferencing session via an adaptive codec switching in accordance with an embodiment of the inventive arrangements disclosed herein.

FIG. 3 is a schematic diagram illustrating a system 300 for optimizing the quality of audio within a teleconferencing session via an adaptive codec switching in accordance with an embodiment of the inventive arrangements disclosed herein. In system 300, an optimization engine can permit a dynamic codec switching during a Voice over Internet Protocol (VoIP) call session to improve call quality. Computing device 360 can capture audio input from input/output components 361 via interface 366. Metrics 370 associated with the quality of experience, call quality, and the like can be conveyed to the server 310. Server 310 can optimize the session 312 based on metrics by selecting appropriate codecs to minimize server 310 processing load and maximize call quality. It should be appreciated that system 300 illustrates a server directed configuration (e.g., client/server architecture) of the disclosure. Other configurations are contemplated (e.g., client directed). System 300 components can be communicatively linked via one or more networks 380.

Telephony server 310 can be a hardware/software entity for executing an optimization engine 320. Server 310 functionality can include, but is not limited to, basic call signaling, session 312 management, encryption, authentication, and the like. Server 310 can include, but is not limited to, optimization engine 320, session 312, switching list 340, data store 330, and the like. In one embodiment, server 310 can receive codec switch command 372 from a computing device 360 authorized to modify session 312 settings. For example, a coordinator of a teleconference meeting can manually elect to switch codecs to improve audio output quality during a session 312 when one or more participants leave the session.

Optimization engine 320 can be a hardware/software element for dynamically optimizing session 312 quality. Engine 320 can include, but is not limited to, quality estimator 322, codec manager 324, signaling component 326, settings 328, and the like. Engine 320 functionality can include, but is not limited to, feedback collection, feedback analysis, heuristic functionality, and the like. In one embodiment, engine 320 can generate and/or manage switching list 340. In one instance, engine 320 can be utilized to create link mapping 332. In the instance, mapping 332 can permit codec 334 selection and/or tracking based on link. In one embodiment, engine 320 can be a functionality of an IBM SAMETIME Unified Telephony software. It should be appreciated that engine can perform the functionality described herein in response to traditional and/or proprietary telephony actions. For example, engine 320 can perform dynamic codec switching in response to a merge call action, a forward call action, a join call action, and the like.

Quality estimator 322 can be a hardware/software entity for determining call quality during session 312. Estimator 322 functionality can include, but is not limited to, metric collection, metric analysis, and the like. Estimator 322 can determine the call quality of a link (e.g., computing device communicating with server 310), overall call quality, and the like. In one embodiment, estimator 322 can evaluate a call/link quality to determine a codec change event. In one instance, estimator 322 can automatically request metrics 370 and/or perform metric collection in response to changes in session settings, participant number, network 380 conditions, and the like. For example, when network latency increases, estimator 322 can obtain metrics to determine if a codec switch is necessary (e.g., high latency, switch to more efficient codec).

Codec manager 324 can be a hardware/software element for organizing codec 364 within one or more sublists 342 of switching list 340. Manager 324 functionality can include, but is not limited to, codec 364 detection, codec 364 switching, and the like. In one instance, manager 324 can be utilized to determine codec performance for organization within switching list 340. In one embodiment, manager 324 can utilize sublist 342 metadata, codec list 344, and/or list 344 metadata to determine one or more appropriate codecs for each link (e.g., network path for device 360) during session 312.

Signaling component 326 can be a hardware/software entity for coordinating codec switching. Component 326 functionality can include, but is not limited to, Session Initiated Protocol (SIP) signaling capabilities, Real Time Transport Protocol (RTP) signaling functionality, and the like. In one instance, component 326 can be utilized to interface with VoIP applications to trigger a codec change. In the instance, component 326 can convey command 372 in response to metric evaluation by estimator 322 and codec determination by manager 324. It should be appreciated that signaling component can utilize traditional and/or proprietary protocols to communicate with open source and closed source (e.g., proprietary) VoIP applications.

Settings 328 can be one or more options for configuring the behavior of system 300, server 310, and/or engine 320. Settings 328 can include, but is not limited to, an engine 320 settings, a quality estimator 322 options, a codec manager 324 settings, a feedback component 326 options, session 312 settings, and the like. Settings 328 can be manually and/or automatically established. In one instance, settings 328 can be heuristically determined from one or more historic settings.

Telephony session 312 can be a semi-permanent interactive information interchange between two or more computing devices 360. Session 312 can include, but is not limited to session data 314, switching list 340, and the like. In one embodiment, session 312 can be a video teleconference session. Session data 314 can include, but is not limited to, a target quality metric, a loss metric, a quality of experience metric, a participant metric, a loss threshold, a codec performance characteristic, and the like.

Switching list 340 can be a data structure for enabling dynamic codec switching in response to participant, loss and/or quality of experience metrics. Switching list 340 can include, but is not limited to, sublist 342, sublist metadata, and the like. In one embodiment, sublist 342 can include a codec list 344 which can delineate codecs available during the session 312 in order of historic performance.

Data store 330 can be a hardware/software component able to persist switching list 340, session 312 data 314, mapping 332, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Link mapping 332 can be a data set for enabling dynamic codec switching within session 312. Mapping 332 can include, but is not limited to, a link identifier, a sublist identifier, a codec identifier, and the like. For example, entry 334 can be utilized to associate a Link A with a Codec A of a Sublist A to enable codec selection tracking per link. In one embodiment, mapping 332 can be dynamically generated at session 312 inception. In the embodiment, engine 320 can manage mapping 332 in real-time or near real-time to track audio codec selection and provide an optimized audio experience.

Computing device 360 can be a hardware/software permitting the execution of a VoIP application 362. Device 360 can include, but is not limited to, input/output components 361, VoIP application 362, settings, interface 366, and the like. Computing device 360 can include, but is not limited to, a desktop computer, a laptop computer, a tablet computing device, a PDA, a mobile phone, and the like. VoIP application 362 can be communicatively linked with interface 366. In one instance, interface 366 can present and/or receive audio input/output 367 to/from components 361. In one embodiment, interface 366 can present settings 328, mapping 332, and the like. VoIP application 362 can include, but is not limited to, codecs 364, application settings 362, and the like. Codecs 364 can include, but is not limited to, SPEEX, OPUS, SILK, H.263, H.264, H.323, G.722, G.711, and the like.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN, and the like.

Drawings presented herein are for illustrative purposes only and should not be construed to limit the invention in any regard. In one embodiment, engine 320 can be a functionality of an Application Programming Interface. Protocols associated with the disclosure can include, but is not limited to, Transport Control Protocol (TCP), Internet Protocol (IP), Hypertext Transport Protocol (HTTP), and the like.

Figure 4:
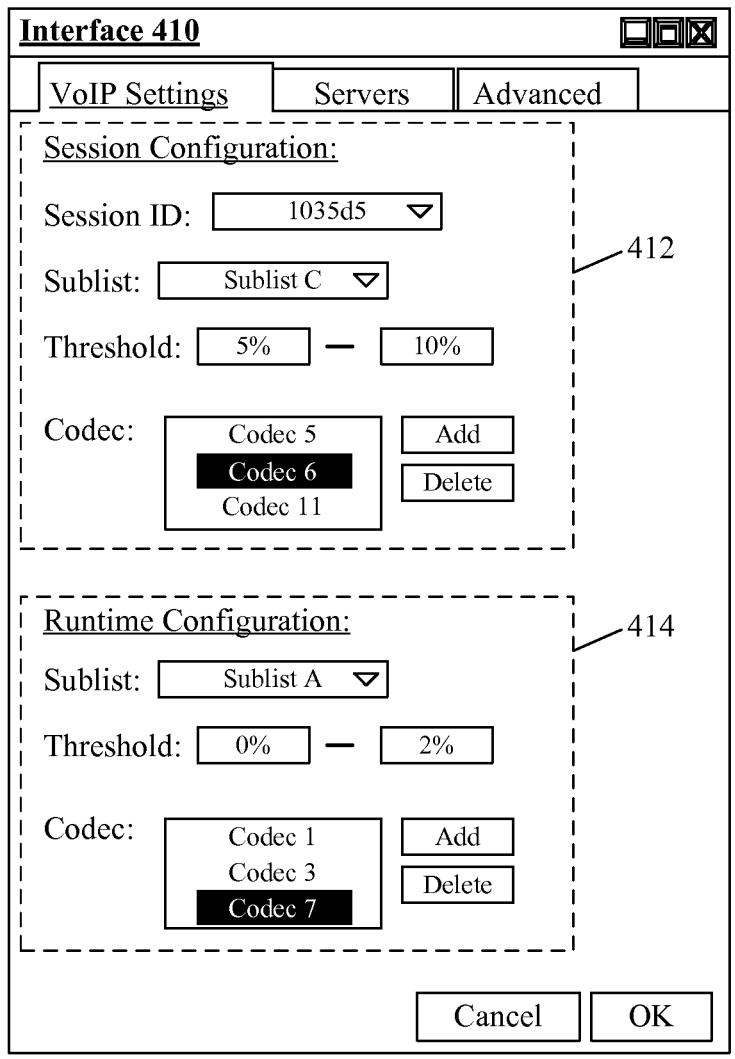
FIG. 4 is a schematic diagram illustrating an interface for optimizing the quality of audio within a teleconferencing session via an adaptive codec switching in accordance with an embodiment of the inventive arrangements disclosed herein.

FIG. 4 is a schematic diagram illustrating an interface 410 for optimizing the quality of audio within a teleconferencing session via an adaptive codec switching in accordance with an embodiment of the inventive arrangements disclosed herein. Interface 410 can present a session configuration 412 and a runtime configuration 414 settings for a VoIP teleconference. The interface 410 can be a screen of a server configuration, a client configuration, and the like.

In session configuration 412, one or more options for establishing a switching list per session can be presented. Options can include, but not limited to, a session identifier, a sublist identifier, threshold values, a codec identifier, and the like. For example, configuration 412 can include a drop down list which can permit the selection of a session identifier. Selection of a session identifier can present the switching list associated with the session. For example, sublists of the switching list for session 1035d5 can be presented within a drop down list. Selection of the sublist can permit the presentation of a loss threshold value for the sublist. For example, when Sublist C is selected a loss threshold for a sublist C can be presented and/or modified. In one instance, configuration 412 can permit the management of codecs within a sublist. In the instance, interface elements (e.g., interactive buttons) can be utilized to add, edit, and/or remove codecs from a selected sublist.

In runtime configuration 414, one or more options for establishing a switching list per runtime environment can be presented. Options can include, but is not limited to, sublist identifier, a threshold values, a codec identifier, and the like. Selection of the sublist can permit the presentation of a loss threshold value for the sublist. For example, when Sublist A is selected a loss threshold for a sublist A can be presented and/or modified. In one instance, configuration 412 can permit the management of codecs within a sublist. In the instance, interface elements (e.g., interactive buttons) can be utilized to add, edit, and/or remove codecs from a selected sublist.

Drawings presented herein are for illustrative purposes only and should not be construed to limit the invention in any regard. It should be appreciated that the interface options can be present within a drop down menu, a context menu, and the like. In one instance, interface 410 can be a screen of an IBM SAMETIME UNIFIED TELEPHONY.

The flowchart and block diagrams in the FIGS. 1A-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for optimizing a VoIP call session comprising:
at least one processor;
a non-transitory storage medium storing program instructions, which are executed by the at least one processor;
an optimization engine, comprising at least a subset of the program instructions, configured to perform adaptive codec switching based on at least one of loss metric, a participant metric, and a quality of experience metric, wherein the codec switching is performed on at least one of a plurality of communication links associated with a telephony session executing within a multi-control unit (MCU), wherein each of the plurality of communication links is associated with a terminal device, wherein each of the terminal devices is able to execute a Voice over Internet Protocol (VoIP) application, wherein each application comprises of at least one audio codec; and
a data store able to persist at least one of a link mapping, a switching list, and a telephony session data, wherein the switching list comprises at least one sublist comprising of at least one codec associated with the VoIP application, wherein the optimization engine is further configured to:
determine a change in the a quantity of the plurality of computing devices resulting in an increase in the packet loss metric of at least one communication link associated with the session;
when the metric is greater than or less than the loss threshold of a sublist, choose a sublist which is approximately equivalent to the metric;
select a codec from the sublist for the one communication link.

2. The system of claim 1, further comprising:
a quality estimator configured to collect at least one metric associated with at least one of the session and the communication link;
a codec manager able to select at least one of a sublist and a codec responsive to an evaluation of a metric during the session; and
a signaling component configured to convey a codec selection to a VoIP application.

3. The system of claim 1, wherein the engine is configured to switch between a subset of codecs available within the session responsive to a metric determination, wherein the metric is at least one of a packet loss, a burst ratio, a one-way delay, and a codec impairment.

4. The system of claim 1, further comprising:
the engine, responsive to determining a different codec is unsupported by the VoIP application associated with the terminal device, selecting another codec from the sublist of which the different codec belongs.

5. The system of claim 1, the engine establishing a performance characteristic associated with the at least one audio codec, wherein the performance characteristic is at least one of a bandwidth requirement, a latency, a sample period, a frame size, and a end user perceived quality.

6. The system of claim 1, further comprising:
the engine, determining a change in the a quantity of the plurality of computing devices resulting in an increase in the packet loss metric of at least one communication link associated with the session; and
when the metric is approximately equivalent the loss threshold of a sublist, the engine switching a selected codec associated with a communication link with an unselected codec of the sublist.

7. The system of claim 1, wherein the optimization engine is further configured to:
- determine a change in the a quantity of the plurality of computing devices resulting in a decrease in the packet loss metric of at least one communication link associated with the session; and
- when the metric is approximately equivalent the loss threshold of a sublist, switch a selected codec associated with a communication link with an unselected codec of the sublist.

8. The system of claim 1, wherein the optimization engine is further configured to:
- determine a change in the a quantity of the plurality of computing devices resulting in a decrease in the packet loss metric of at least one communication link associated with the session;
- when the metric is greater than or less than the loss threshold of a sublist, choose a sublist which is approximately equivalent to the metric; and
- select a codec from the sublist for the one communication link.

9. A computer program product comprising a non-transitory computer readable storage medium having computer usable program code embodied therewith, the computer usable program code comprising:
- computer usable program code stored in a non-transitory storage medium, if said computer usable program code is executed by a processor it is operable to identify a Voice over Internet Protocol (VoIP) session between a plurality of computing devices, wherein each computing device is associated with a communication link, wherein each of the computing devices executes a VoIP application, wherein each application comprises of a plurality of selectable codecs, wherein the codecs are at least one of an audio codec and a video codec;
- computer usable program code stored in a non-transitory storage medium, if said computer usable program code is executed by a processor it is operable to generate a unique list of the plurality of selectable codecs, wherein the list comprises of a plurality of sublists, wherein each sublist comprises of at least one of the codecs;
- computer usable program code stored in a non-transitory storage medium, if said computer usable program code is executed by a processor it is operable to associate a loss threshold with each sublist based on previously determined performance characteristics of the codecs, wherein the loss threshold is a packet loss threshold value of the communication link associated with at least one of the plurality of computing devices; and
- computer usable program code stored in a non-transitory storage medium, if said computer usable program code is executed by a processor it is operable to evaluate a packet loss metric of the communication link, wherein the communication link is associated with a codec of at least one of the plurality of sublists; and
- computer usable program code stored in a non-transitory storage medium, if said computer usable program code is executed by a processor it is operable to perform a programmatic action to select a different codec from at least one of the plurality of sublists responsive to the evaluating.

10. The computer program product of claim 9, wherein the computer program product is an IBM SAMETIME UNIFIED TELEPHONY software.

11. A system for optimizing a VoIP call session comprising:
- at least one processor;
- a non-transitory storage medium storing program instructions, which are executed by the at least one processor;
- an optimization engine, comprising at least a subset of the program instructions, configured to perform adaptive codec switching based on at least one of loss metric, a participant metric, and a quality of experience metric, wherein the codec switching is performed on at least one of a plurality of communication links associated with a telephony session executing within a multi-control unit (MCU), wherein each of the plurality of communication links is associated with a terminal device, wherein each of the terminal devices is able to execute a Voice over Internet Protocol (VoIP) application, wherein each application comprises of at least one audio codec; and
- a data store able to persist at least one of a link mapping, a switching list, and a telephony session data, wherein the switching list comprises at least one sublist comprising of at least one codec associated with the VoIP application, wherein the optimization engine is further configured to:
  - determine a change in the a quantity of the plurality of computing devices resulting in a decrease in the packet loss metric of at least one communication link associated with the session;
  - when the metric is greater than or less than the loss threshold of a sublist, choose a sublist which is approximately equivalent to the metric; and
  - select a codec from the sublist for the one communication link.

12. The system of claim 11, further comprising:
- a quality estimator configured to collect at least one metric associated with at least one of the session and the communication link;
- a codec manager able to select at least one of a sublist and a codec responsive to an evaluation of a metric during the session; and
- a signaling component configured to convey a codec selection to a VoIP application.

13. The system of claim 11, wherein the engine is configured to switch between a subset of codecs available within the session responsive to a metric determination, wherein the metric is at least one of a packet loss, a burst ratio, a one-way delay, and a codec impairment.

14. The system of claim 11, further comprising:
- the engine, responsive to determining a different codec is unsupported by the VoIP application associated with the terminal device, selecting another codec from the sublist of which the different codec belongs.

15. The system of claim 11, the engine establishing a performance characteristic associated with the at least one audio codec, wherein the performance characteristic is at least one of a bandwidth requirement, a latency, a sample period, a frame size, and a end user perceived quality.

16. The system of claim 11, further comprising:
- the engine, determining a change in the a quantity of the plurality of computing devices resulting in an increase in the packet loss metric of at least one communication link associated with the session; and
- when the metric is approximately equivalent the loss threshold of a sublist, the engine switching a selected codec associated with a communication link with an unselected codec of the sublist.

17. The system of claim 11, wherein the optimization engine is further configured to:

determine a change in the a quantity of the plurality of computing devices resulting in a decrease in the packet loss metric of at least one communication link associated with the session; and when the metric is approximately equivalent the loss threshold of a sublist, switch a selected codec associated with a communication link with an unselected codec of the sublist.

\* \* \* \* \*